United States Patent Office 2,891,024
Patented June 16, 1959

2,891,024

METHYLOLATED ROSINS IN EMULSION POLYMERIZATION

Stearns T. Putnam, Wilmington, Del., assignor to Hercules Powder Company, Wilmington, Del., a corporation of Delaware No Drawing. Application February 9, 1956
Serial No. 564,356

5 Claims. (Cl. 260—27)

This invention relates to an improved process for the polymerization of unsaturated compounds and, more particularly, to a process for the emulsion polymerization of vinyl, vinylidene, and vinylene compounds at temperatures below 10° C.

It is well known that unsaturated compounds, and particularly those which contain the vinyl group, may be advantageously polymerized in aqueous emulsion. Thus, synthetic, rubberlike materials have been prepared by the emulsion polymerization of diolefins and by the interpolymerization of diolefinic compounds with other unsaturates such as styrene, acrylic acid esters, acrylonitrile, and like materials. Likewise, such materials as polyvinyl halides, polyvinyl acetate, polystyrene, polymethyl methacrylate and various other addition polymers have been prepared by the emulsion polymerization technique.

The emulsion polymerization of vinyl compounds has customarily been effected at relatively high temperatures. For example, a temperature of about 122° F. has been accepted as a standard for the commercial production of the butadiene-styrene copolymer type synthetic rubbers. Conventional peroxide catalysts such as potassium persulfate or benzoyl peroxide, and fatty acid soap emulsifying agents such as potassium oleate have normally been employed in such polymerization processes. These prior art emulsion polymerization processes are, however, not as advantageous in some respects as are polymerizations carried out at lower temperatures. It is known, for example, that the synthetic rubberlike materials produced by emulsion polymerization at temperatures substantially below 122° F. are markedly superior in important physical characteristics such as tensile strength, elongation, flex life, resilience and resistance to accelerated aging, to similar materials prepared within the conventional temperature ranges.

One of the problems which has heretofore hampered the commercial production of synthetic rubberlike materials by the low temperature emulsion polymerization of vinyl compounds has been that of reducing the reaction time required to produce a desirable yield of polymeric materials. While in some instances these difficulties were overcome at least partially by the utilization of a more active initiating agent, it was usually found necessary in each case to resort also to more expensive emulsifying agents, thus making the process unattractive economically. Consequently, one of the major problems of the art has been to find a process for the low temperature emulsion polymerization of vinyl compounds which would result in a good quality product after a reasonable reaction time and which would allow the use of ingredients cheap enough to render the process economically feasible.

Now, in accordance with this invention, it has been discovered that the polymerization of organic compounds containing the $CH_2=C<$ group may be effected at temperatures below about 10° C. in aqueous emulsion in the presence of a peroxidic catalyst, a material capable of forming an electromotive couple having a standard oxidation-reduction potential between about −1.0 and about −0.3 volt as an activating agent, and an emulsifying agent comprising an alkali metal salt of a hydrogenated rosin acid carbinol.

The standard oxidation-reduction potential to which reference is made herein is the value in volts of the electrical potential of the couple in question determined at 25° C. under a pressure of one atmosphere with solutions of one molal activity referred to the potential of the hydrogen-hydrogen ion couple as zero. The sign of the oxidation-reduction potential value is negative when the reduced form of the couple is a weaker reducing agent than hydrogen.

One of the components of the activating agents used in this invention may be a metallic reducing agent, and the term "metallic reducing agent" is utilized herein to designate all of those materials which contain metallic atoms and which are capable of acting as reducing agents, i.e., which are capable of donating an electron to other components of the reaction mixture. Thus, there is embraced by the term "metallic reducing agent" not only the free metallic ions such as the ferrous ion ($Fe^{++}$) but also complexes of such metallic ions such as the ferrous pyrophosphate complex. Likewise included are metallic compounds which are substantially completely insoluble but which nevertheless act as reducing agents such as, for example, nickel hydroxide ($Ni(OH)_2$) which forms the couple $Ni(OH)_2 + 2OH^- \rightarrow NiO_2 + 2H_2O + 2e^-$ the standard oxidation-reduction potential of which is −0.5 volt.

The hydrogenated rosin acid carbinols, the alkali metal salts of which are contemplated for use as emulsifiers herein, are methylol derivatives of saturated rosin acids which may be prepared by reacting ingredients consisting essentially of carbon monoxide, hydrogen and a rosin acid, or rosin acid containing material, such as rosin, tall oil and the like, in the presence of a cobalt catalyst at a temperature ranging from 120° to about 230° C., preferably from about 180° to 200° C., and at a pressure ranging from about 1500 to 15,000 p.s.i., preferably from about 3000 to about 6000 p.s.i.

The carbon monoxide to hydrogen ratio is not critical and may vary, on a molar basis, from about 1:1 to 1:20 with a molar ratio of 1:2 to 1:3 being preferred in order to obtain the highest yield of carbinols. As the ratio is raised to about 1:1 and higher, e.g., 2:1, increasing amounts of aldehyde derivatives are obtained.

The products obtained by following the procedure generally described hereinabove vary in physical properties according primarily to the nature of the rosin acid or rosin acid-containing material utilized as a reactant. In general, however, they are light-to-amber colored resinous substances having an acid number somewhat less than that of the primary reactant but having a considerably higher hydroxyl number.

Chemically, these products contain a high proportion of methylol derivatives of the starting rosin or rosin acid-containing material which is a result of the introduction of a methylol group at one or more points of olefinic unsaturation. Hydrogenation of double bonds also accompanies the introduction of the methylol group so that the products are normally saturated. Various side reactions occur to a lesser extent depending upon the reaction conditions. For example, esters can be derived from the condensation of the methylol derivatives produced.

In the usual case, only one methylol group is introduced into each unsaturated compound used as a starting material. However, in the case of, for example, dextropimaric acid, the product has been found to contain up to 40% by weight of a dimethylol derivative.

For purposes of illustration, when rosin is treated according to the described procedure, the product is believed to comprise a mixture of the following compounds: (1) methylol substituted acids derived from abietic acid and dihydroabietic acid with the probable structure:

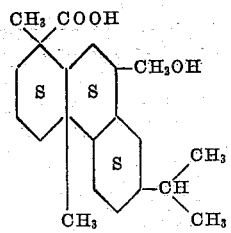

wherein the —CH₂OH group is attached to a ring at a carbon other than a tertiary substituted one, probably 8 or 9; (2) methylol substituted acids derived from dextropimaric acids, probable structure:

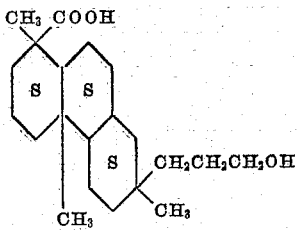

(3) dimethylol-substituted acids derived from dextropimaric acids, probable structure:

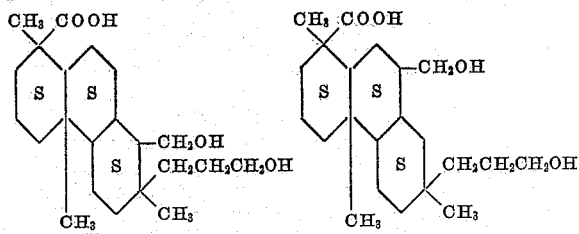

(4) alcohols derived from the olefinically unsaturated compounds in the neutrals; (5) unreacted acids, primarily dehydroabietic and tetrahydroabietic acids; (6) esters derived from the condensation of any of the above compounds; and (7) aldehyde derivatives of the unsaturated rosin acids.

In the case of rosin acid-containing materials such as tall oil, which contains olefinically unsaturated fatty acids in addition to the rosin acids, there will also be produced methylol derivatives of such fatty acids.

The following examples will serve to illustrate the preparation of typical products, the alkali metal salts of which are suitable for use as emulsifiers in the process of the present invention. In these examples, percentages are by weight unless otherwise specified. The cobalt carbonyl catalyst utilized was prepared as follows:

PREPARATION OF COBALT CARBONYL CATALYST

A 500-cc. stainless steel autoclave was charged with 30 g. of cobalt carbonate and 150 g. of cyclohexane. After pressure testing and flushing, the autoclave was pressured to 3500 p.s.i. of CO—H₂ (1:1 ratio) and heated to 160° C. The reactor was kept at 160° C. and 5000–4800 p.s.i. for 2 hours, then cooled to room temperature and vented.

The product was a dark brown solution containing cobalt hydrocarbonyl. On cooling the solution, orange crystals precipitated and were isolated. These crystals were dicobalt octacarbonyl.

Typical analysis of the solution: 0.02 g. of cobalt/g. of solution
Typical analysis of crystals:
  Found, 33.8% cobalt
  Calculated, 34.5% cobalt

Example 1

A stainless steel rocking type autoclave was charged with 232 parts of a 50% solution of distilled N-wood rosin [acid number 170.5, percent carbonyl (Desseigne) 0.58%, percent hydroxyl (acetylation) 1.9, gasoline insolubility 1.0%] in cyclohexane and 30 parts of cobalt carbonyl solution which contained 0.018 part of cobalt per part of solution. Following a pressure test with nitrogen, the autoclave was flushed with carbon monoxide, pressured to 2000 p.s.i. with a 1:1 molar carbon monoxide-hydrogen mixture, and heating and agitation was started. At 125° C. the pressure had increased to 2700 p.s.i. and it was raised to 5000 p.s.i. The temperature was raised over the period of 3 hours to 180° C. and the pressure was maintained at 5000 p.s.i. by periodically adding more carbon monoxide-hydrogen mixture. The autoclave was maintained at 180° C. for 2 more hours and 350 p.s.i. of gas was absorbed. No drop in pressure was observed during last one hour. The autoclave was then cooled to room temperature, vented and product removed. The product was diluted with more solvent, extracted with dilute hydrochloric acid to remove the catalyst, washed neutral and dried over sodium sulfate. The solvent was removed by distillation under vacuum and a yellow resin was obtained. The product had the following properties: acid number 146.5, percent hydroxyl (acetylation) 3.13, percent carbonyl (Desseigne) 2.98, gasoline insolubility 23%, yield of methylol derivative 29.5%, and yield of aldehyde derivative 31.5%.

Example 2

A stainless steel rocking type autoclave was charged with 250 parts of distilled tall oil (acid number 188, saponification number 188, percent hydroxyl (acetylation) 0.14), 200 parts of cyclohexane and 80 parts of cobalt carbonyl solution (containing about 2 parts of cobalt). The autoclave was flushed, pressure tested at 3000 p.s.i. with a carbon monoxide-hydrogen mixture (1:2 molar ratio) and heated to 200° C. with agitation. At 200° C. the pressure was raised from 2050 to 5000 p.s.i. and maintained at 5000 p.s.i. by periodic raises. After 3 hours at temperature, 600 p.s.i. of gas was absorbed and the reactor was cooled to room temperature, vented and the product removed. The product was diluted with ether, and extracted with 6 N hydrochloric acid to remove the catalyst. The light yellow ether solution was then washed neutral, dried over sodium sulfate and distilled under vacuum to remove the solvent.

The final product was a light yellow solid which had the following properties: acid number 85, saponification number 178, percent hydroxyl (acetylation) 1.6, and yield of methylol derivative 84.5%.

Example 3

A stainless steel rocking type autoclave was charged with 250 parts of crushed N-wood rosin [acid number 167.0, saponification number 170.0, percent hydroxyl (acetylation) 0.90, percent carbonyl (Desseigne) 0.54], 150 parts of cyclohexane and 100 parts of cobalt carbonyl solution (containing about 0.03 part of cobalt/g. of solution). The autoclave was flushed, pressure tested with a carbon monoxide-hydrogen gas mixture (1:2 molar ratio) at 3000 p.s.i., and heated to 200° C. with agitation. At 160° C. reaction had started and the pressure was raised from 3000 p.s.i. to 5000 p.s.i. During the heat-up, 900 p.s.i. of gas mixture was absorbed. At 200° C. another 600 p.s.i. of gas was absorbed over a period of 2.1 hours. The autoclave was then cooled to room temperature and vented. The product was diluted with ether, extracted with dilute hydrochloric acid to remove the catalyst, washed neutral and dried over sodium sulfate. The solvent was removed by distillation under vacuum and a light yellow resin was obtained.

The product had the following properties: acid number 144, saponification number 176, percent hydroxyl (acetylation) 4.2, percent carbonyl (Desseigne) 0.28, and percent yield of methylol derivative 89.5 percent.

Example 4

A stainless steel rocking type autoclave was charged with 169 parts of the methyl ester of rosin [acid number 7.0, saponification number 158, percent carbonyl (Desseigne) 0.12, percent hydroxyl (acetylation) 0.08] and 45 parts of cobalt carbonyl solution (containing 1.03 parts of cobalt). Following a pressure test with nitrogen, the autoclave was flushed with a carbon monoxide-hydrogen mixture (1:1 molar ratio) and heating and agitation was started. At 180° C. the pressure was raised from 2000 to 3700 p.s.i. Over a period of 1½ hours gas absorption took place (650 p.s.i.). The temperature was then raised to 200° C. and in 3½ hours another 400 p.s.i. of gas was absorbed. The autoclave was then cooled, vented and the product was removed. The catalyst was removed from a solution of the product by acid extraction. The solution was then washed neutral and the solvent removed by distillation under vacuum. The product had the following properties: acid number 7.5, saponification number 163, percent hydroxyl (acetylation) 2.9, percent carbonyl (Desseigne) 1.8, yield of methylol derivative 64%, and yield of aldehyde derivative 23%.

Example 5

A stainless steel rocking type autoclave was charged with 250 parts of WW Nelio gum rosin [acid number 162.5, saponification number 181, percent hydroxyl (acetylation) 0.80, drop softening point 84° C.], 250 parts of cyclohexane, 100 parts of cobalt carbonyl solution (containing about 3 parts of cobalt). The autoclave was flushed, pressure tested with a carbon monoxide-hydrogen gas mixture (1:2 molar ratio) at 3000 p.s.i. and heated to 200° C. with agitation. At 200° C. the pressure was raised to 5000 p.s.i. and over a period of 4 hours 4400 p.s.i. of gas was absorbed (the pressure was maintained at 5000 p.s.i. by periodic raises).

The product was recovered in the manner described in Example 1. The product was a light yellow resin with the following properties: acid number 139, saponification number 168.5, percent hydroxyl (acetylation) 4.0, drop softening point 104° C., and yield of methylol derivative 92%.

Example 6

A stainless steel rocking type autoclave was charged with 250 parts of pine wood resin [acid number 140, saponification number 166, percent hydroxyl (acetylation) 3.0], 250 parts of cyclohexane and 100 parts of cobalt carbonyl solution (containing about 3 parts of cobalt). The autoclave was flushed, pressure tested with a carbon monoxide-hydrogen gas mixture (1:2 molar ratio) at 3000 p.s.i. and heated to 200° C. with agitation. At 200° C. the pressure was raised from 2300 to 5000 p.s.i. and maintained at 5000 p.s.i. by periodic raises. Over a period of 4 hours 1400 p.s.i. of gas was absorbed.

The product was processed in the manner described in Example 1. The product was an amber colored resin with the following properties: acid number 116, saponification number 159, percent hydroxyl (acetylation) 4.5, and yield of methylol derivative 52.5%.

Example 7

A stainless steel rocking type autoclave was charged with 30.2 parts of abietic acid (acid number 191, U.V. analysis 92% abietic acid), 200 parts of cyclohexane and 2 parts of dicobalt octacarbonyl. The autoclave was flushed, pressure tested with a carbon monoxide-hydrogen gas mixture (1:2 molar ratio) at 3500 p.s.i. and heated to 200° C. with agitation. After one hour at 200° C. and 4800 p.s.i. pressure, the reactor was cooled to room temperature, vented and the product removed.

The product was processed by the same method as described in Example 1. The final product was a light yellow resinous solid with the following properties: acid number 169, saponification number 170, percent hydroxyl (acetylation) 3.45, percent hydrogen absorption 0.23, U.V. analysis 0.1% abietic acid, and yield of methylol derivative 72% (based on abietic acid present).

Example 8

This example illustrates the recovery of relatively pure methylol substituted rosin acids from a crude methylol derivative of rosin.

Two hundred and three parts of a crude methylol derivative of rosin [percent hydroxyl (acetylation) 3.37] was dissolved in approximately 850 parts of dimethylformamide (technical grade). There was added 200 parts of distilled water and the resultant solution was extracted twice with about 2100 parts of n-heptane. There was recovered fom the aqueous phase 100.3 parts of methylol substituted rosin acids (percent hydroxyl 5.18).

The alkali metal salts of the products hereinabove described, when utilized as emulsifiers, permit shorter polymerization reaction times at low temperatures, without sacrifice in yield, than has heretofore been possible.

The following examples are illustrative of the preparation of polymers by emulsion polymerization in accordance with this invention. The p-menthane hydroperoxide catalyst utilized in these examples was commercially available material obtainable from Hercules Powder Company. The methylol derivative of tall oil utilized in forming the emulsifier of Example 9 was prepared following the procedure of Example 2 and the methylol derivative of rosin utilized in forming the emulsifier of Example 10 was prepared following the procedure of Examples 3. The potassium soaps of the products thus obtained were then prepared by, in each case, adding the appropriately diluted alkali to the molten resin with adequate stirring. All parts in the examples relative to the hydroperoxides are on a 100% basis and all parts represent parts by weight.

Example 9

In this and the following example, copolymers of butadiene-1,3 and styrene were prepared in glass containers. In this example the reaction mixture was formulated from the following ingredients in the proportions indicated:

| Ingredients | Parts |
| --- | --- |
| Butadiene | 75. |
| Styrene | 180. |
| Water (total) | 180. |
| Potassium paste (80% solids) soap of methylol derivative of tall oil. | 4.5. |
| Potassium hydroxide (½ N) | Sufficient to adjust to pH 11.3. |
| Trisodium phosphate dodecahydrate | 0.5. |
| p-Menthane hydroperoxide | 0.12. |
| Sulfole (a polymerization grade mercaptan, primarily a tertiary dodecyl mercaptan). | 0.3. |
| Tamol N (a condensed sodium alkarylsulfonate) | 0.1. |
| Ferrous sulfate heptahydrate | 0.20. |
| Potassium pyrophosphate | 0.228. |

The ferrous pyrophosphate activator was prepared by adding a dilute solution of ferrous sulfate to a dilute solution of potassium pyrophosphate at room temperature and then aging at 60° C. for 30 minutes.

The reaction mixture was agitated in a closed vessel at 5° C. and sampled periodically to determine monomer conversion. It was determined that 60% conversion was obtained in 3.5 hours as compared to 5.1 hours when the potassium salt of the methylol derivative of tall oil was replaced by a mixture of fractionally distilled fatty acids (Armour's Neo-fat K-245), and 3.8 hours when the potassium salt of the methylol derivative of tall oil was replaced by a mixture of 2.25 parts of the potassium soap of a treated rosin-fatty acid mixture approximately 1:1 in ratio and 2.14 parts sodium soap flakes.

Example 10

In this example butadiene and styrene were copolymerized according to the procedure of Example 9 with the exception that a potassium paste (80% solids) soap of a methylol derivative of rosin was utilized as the emulsifier.

In this example the time for 60% conversion was 3.7 hours as compared with 5.3 hours when the potassium salt of a disproportionated rosin was used as the emulsifier.

The rosins which may be utilized to prepare the methylol derivatives which, in turn, are converted to alkali metal salts to obtain the emulsifiers for use in the present invention may be those obtained by extraction from the stumps of the Jeffrey and ponderosa pines as well as the rosins well known to the art, such as, for example, the rosins obtained from the southern long leaf or slash pine tree. The rosins may be of either the crude or refined types having color grades from FF to WW and may be of either the wood or gum variety. The refined types of rosin may be those which have been distilled under reduced pressure; distilled under reduced pressure with the injection of an inert gas; extracted with color body solvents; treated with various adsorbents for the removal of various impurities, as color bodies, visible and latent, oxidized resin acids, etc.

In addition to ordinary rosin, there may be utilized olefinically unsaturated rosin compounds, such as partially dehydrogenated or heat-treated rosins, polymerized rosins, and partially hydrogenated rosins. These compounds and also the rosins contain, in addition to various rosin acids, a nonacidic or neutral portion which may be present in amounts varying between 8.7% and about 24.4% by weight. They generally have acid numbers varying between about 140 and 170.

In addition to wood and gum rosins, the olefinically unsaturated rosin compounds which may be used include unsaturated acids obtainable from rosins, such as, for example, abietic, dihydroabietic, neoabietic, dextropimaric, etc.; esters of these rosin acids with a monohydric or polyhydric alcohol, such as methyl abietate, ethyl abietate, glycerol abietate; rosin nitriles; the alcohols produced by the reduction of the carboxyl group of an unsaturated rosin acid, such as dihydroabietyl alcohol, and also the esters of these alcohols. Also, there may be used rosin acids-containing materials, such as tall oil and rosins separated from tall oil, such as sulfate wood rosin. Also, there may be used various pine wood resins obtained during the process of refining crude rosin to paler grades, which resins are rich in olefinically unsaturated rosin acid content.

The method of preparation of the methylol derivatives of rosins and olefinically unsaturated rosin compounds utilized in the process of the present invention and briefly described hereinabove is more fully described and exemplified in the copending application of Dewey R. Levering, Serial No. 465,426, filed October 28, 1954, and now abandoned. Any of the products therein disclosed, and particularly those products derived from rosin and tall oil, can be used as emulsifiers in the process of the present invention.

The emulsifying agents hereinbefore described may be employed in an amount equivalent to from about 0.2% to about 5% based on the total emulsion polymerization reaction mixture. A preferred range on this basis is from about 0.5% to about 2% of the weight of the reaction mixture. The concentration of the emulsifying agent in the aqueous phase may be from about 0.5% to about 5%, preferably from about 1% to about 3%. Based on the weight of the monomers originally present, the emulsifying agent may be utilized in an amount equivalent to from about 0.5% to about 15% of the weight thereof and preferably in an amount equivalent to from about 2% to about 6% of the weight thereof.

The polymerization process in accordance with this invention may be carried out with the use of any peroxidic catalyst such as t-butyl hydroperoxide, benzoyl peroxide, α,α-dimethylbenzyl hydroperoxide, and the like. It is preferable to utilize as catalyst a tertiary hydroperoxide having more than five carbon atoms, preferably between six and thirty carbon atoms, and most desirably between seven and fifteen carbon atoms. The tertiary hydroperoxides may be given the general formula of ROOH in which R may be any hydrocarbon radical containing a tertiary carbon atom to which is attached the hydroperoxy (—OOH) group. R may be, for example, a saturated aliphatic hydrocarbon radical containing a tertiary carbon atom such as the triethylmethyl radical in triethylmethyl hydroperoxide, a cycloaliphatic hydrocarbon radical such as the 1,3-dimethylcyclopentyl radical in 1,3-dimethylcyclopentyl 1-hydroperoxide or an aralkyl radical such as the α,α-dimethylbenzyl radical in α,α-dimethylbenzyl hydroperoxide. From the standpoint of commercial availability those hydroperoxides similar to α,α-dimethylbenzyl hydroperoxide are particularly useful. The latter is illustrative of the general class of hydroperoxides known as α,α-dialkylarylmethyl, or aryl(dialkyl)methyl, hydroperoxides.

The α,α-dialkylarylmethyl hydroperoxides may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° and about 95° C. in the presence of an aqueous alkali. The concentration of the aqueous alkali may be between about 1% and about 35% although it is preferable to use concentrations of about 2% to about 8%. Vigorous agitation is desirable during the oxidation reaction.

As illustrative of the alkyl-substituted aromatic organic compounds which may be oxidized, p-cymene, cumene, diisopropylbenzene, and sec-butylbenzene may be mentioned. These compounds lead to α,α-dimethyl-p-methylbenzyl, α,α-dimethylbenzyl, α,α-dimethyl - p - isopropylbenzyl, and α,α-ethylmethylbenzyl hydroperoxides, respectively. The aryl and alkaryl groups need not be derived from benzene, as is the case in the aforementioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, secondary butyl, tertiary butyl and the like, the same alkyl groups also being representative of $R_1$ and $R_2$ in the structural formula. $R_1$ and $R_2$ may be either the same or different.

The amount of catalyst which may be used in accordance with this invention may be between about 0.1% and about 20% based on the amount of solid emulsifying agent used. The preferable amount of hydroperoxide on this basis, however, is from about 2% to about 6%. Based on the monomers, the amount of hydroperoxide may be from about 0.001% to about 5.0%, a desirable range being from about 0.02% to about 1.5%, and the preferable amount of catalyst on this basis being from about 0.1% to about 0.6%.

The activators which are operable in the process of this invention comprise those electromotive couples having a standard oxidation-reduction potential between about —1.0 and about —0.3 volt, preferably between about —0.8 and about —0.5 volt. Such activators should be capable of reducing a hydroperoxide such as, for example, phenylcyclohexyl hydroperoxide to a ketone in better than about 25% yield in from about 0.25 hour to about 50 hours. Preferable are those electromotive couples containing a metallic reducing agent, such as the ferrous ($Fe^{++}$) ion, which forms a couple in the reaction mixture with an analogous material of higher oxidation state, such as the ferric ($Fe^{+++}$) ion.

Insofar as the preparation of ferrous pyrophosphate activators is concerned, the pyrophosphate compound and the ferrous salt utilized should be employed in such proportions that there is present in the reaction mixture in which the activator is formed from about 0.3 to about 2.5 chemical equivalents of the pyrophosphate for each chemical equivalent of the ferrous salt. A preferable range is from about 0.8 to about 2.0 chemical equivalents of pyrophosphate per chemical equivalent of ferrous salt. Particularly desirable is the presence of about 1.4 chemical equivalents of pyrophosphate for each chemical equivalent of ferrous salt. Soluble ferrous salts other than ferrous sulfate, such as, for example, ferrous chloride either alone or in combination with other reducing agents such as reducing sugars may, of course, be utilized in the preparation of the ferrous activators which are operable in the process of this invention. Likewise, similar salts of analogous metals may be employed. It is desirable, of course, that the metallic ion component of these salts be in a reduced oxidation state. Furthermore, the ferrous and analogous metallic ions derived from these salts may be complexed with anions other than the pyrophosphate ion to form operable activators. For example, gluconate and citrate ions may be so utilized. The ferrous complex of ethylenedinitrilotetraacetic acid, ferrous-o-phenanthraline and polyamines such as diethylenetriamine, triethylenetetramine and tetraethylenepentamine also are operable.

The reducing agents operable in this invention, it will be observed, are essentially characterized by their ability to form an electromotive couple having a standard oxidation-reduction potential of between —1.0 and —0.3 volt and it is this electrochemical manifestation of these compounds which is the critical factor in distinguishing the reducing agents of this invention from other reducing agents.

The activator may be used in such an amount that there is provided from about 0.1 to about 3.0 electrons for each hydroperoxy radical. A preferable range for freshly prepared activators is from about 0.8 to about 1.2 electrons per hydroperoxy radical, and that for activators aged at room temperature or by heating for a short time at elevated temperatures is from about 0.8 to about 2.0 electrons per hydroperoxy radical.

Aqueous solutions of water-soluble organic compounds of low freezing point may be employed as antifreeze media when the process of this invention is carried out at sub-zero temperatures. Thus, water solutions of the lower alkanols, such as methanol and ethanol, may be utilized. Also operable are water solutions of other alcohols, including polyfunctional alcohols such as glycerol or ethylene glycol. In fact, at quite low temperatures, better reaction rates are often obtained by the utilization as antifreeze agents of such polyfunctional molecules. If desired, water solutions of nonalcoholic compounds such as acetone and methyl acetate may be employed. In any particular instance, those skilled in the art will be able to select or formulate a reaction medium, the freezing point of which is below the temperature at which it is desired to effect a particular polymerization reaction. Such reactions may be readily carried out at temperatures of —15° C. in a medium consisting of 3 parts of water and 1 part methanol. As previously indicated, it is advantageous prior to admixing the emulsifying agent with the other ingredients of the polymerization system to form a solution or suspension thereof in a portion of the antifreeze medium.

It is desirable, particularly in the polymerization of those compounds leading to synthetic rubberlike materials, that there be included in the polymerization reaction mixture a modifying agent. The conventional modifying agents may be used in the process of this invention. Thus, the mercaptans normally so employed may be utilized, and the amount may be that usually used, for example, in the preparation of synthetic rubbers. It is desirable, however, that the mercaptan modifier be tertiary for the reason that improved modification of the rubber is thereby obtained. Primary mercaptans may, however, be employed if desired.

The emulsion polymerization of the vinyl, vinylene and vinylidene compounds may be effected in accordance with this invention at temperatures up to about 10° C. Temperatures as low as —70° C. may be employed if desired. The preferable temperature range is from about —30° C. to about 10° C.

If desired, small quantities of inorganic salts such as trisodium phosphate or potassium chloride may be added to the reaction mixture to reduce the viscosity of the latices of the polymers obtained. The utilization of large quantities of such salts, however, adversely affects the rate and extent of polymerization. A preferable range of concentration of such salts is from about 0.1 to about 0.5% of the weight of the monomers. Except as otherwise indicated, the conventional emulsion polymerization techniques, concentrations of reactants and reaction conditions may be utilized in practicing the process of this invention.

Any vinyl compound which may be advantageously polymerized by peroxide initiation in an emulsion polymerization process is operable according to the process of this invention. Illustrative of these compounds are the conjugated butadienes such as butadiene-1,3, isoprene, 2,3-dimethyl butadiene-1,3, chloroprene, piperylene, monomer mixtures of two or more of these conjugated butadienes such as a mixture of butadiene-1,3 and 2,3-dimethyl butadiene-1,3 and monomer mixtures of one or more of these conjugated butadienes with vinyl compounds such as styrene, p-chlorostyrene, p-methoxystyrene, vinyl naphthalene acrylic acid, methacrylonitrile, methyl methacrylate, methyl acrylate, methyl vinyl ketone, methyl isopropenyl ketone, methyl vinyl ether and the like. The process of this invention is particularly applicable to the preparation of the copolymers of butadiene and styrene or acrylonitrile, isoprene and styrene or acrylonitrile, and other rubberlike copolymers as well as in the preparation of polymers such as polyvinyl chloride, polyvinyl acetate, polystyrene, polymethylmethacrylate, polyvinylidene chloride, polyvinyl pyridine, and the various other addition polymers which may be prepared by the emulsion technique.

From the foregoing, it will be apparent that the term "hydrogenated rosin acid carbinol," as used herein, is intended to include within its scope methylol derivatives of rosin and olefinically unsaturated rosin compounds.

What I claim and desire to protect by Letters Patent is:

1. The process which comprises polymerizing an organic compound containing the $CH_2=C<$ group at a temperature between about 10° C. and —70° C. in aqueous emulsion in the presence of an organic peroxide as catalyst, a metal electromotive couple having a standard oxidation-reduction potential between about —1.0 and about —0.3 volt as activator, and between about 0.2% and about 5% of an emulsifying agent comprising an alkali metal salt of the reaction product obtained by reacting carbon monoxide and hydrogen in a molar ratio from about 1:1 to about 1:20 with an olefinically unsaturated material selected from the group consisting of abietic acid, dihydroabietic acid, dextropimaric acid, rosin, partially dehydrogenated rosin, polymerized rosin, partially hydrogenated rosin, esters of rosin with monohydric alcohols, esters of rosin with polyhydric alcohols, rosin nitriles and tall oil at a temperature of from about 120° C. to about 230° C. and at a pressure of about 1500 to 15,000 p.s.i. in the presence of a cobalt carbonyl catalyst, said reaction product containing methylol derivatives of the olefinically unsaturated material and having from 1-2 methylol groups per molecule.

2. The process of claim 1 in which butadiene-1,3 and styrene are copolymerized.

3. The process of claim 1 in which the olefinically unsaturated material is rosin.

4. The process of claim 1 in which the olefinically unsaturated material is tall oil.

5. The process of claim 1 in which the cobalt carbonyl catalyst is dicobalt octacarbonyl.

References Cited in the file of this patent

UNITED STATES PATENTS

| | | |
|---|---|---|
| 2,383,289 | Bried | Aug. 21, 1945 |
| 2,648,655 | Vandenberg | Aug. 11, 1953 |

UNITED STATES PATENT OFFICE

CERTIFICATE OF CORRECTION

Patent No. 2,891,024                          June 16, 1959

Stearns T. Putnam

It is hereby certified that error appears in the printed specification of the above numbered patent requiring correction and that the said Letters Patent should read as corrected below.

Column 6, in the table, second column thereof, opposite "Styrene" for "180" read -- 25 --.

Signed and sealed this 20th day of October 1959.

(SEAL)

Attest:

KARL H. AXLINE
Attesting Officer

ROBERT C. WATSON
Commissioner of Patents